United States Patent [19]

von Bonin et al.

[11] 4,282,329

[45] Aug. 4, 1981

[54] STABILIZED FILLER SUSPENSIONS IN POLYOLS

[75] Inventors: Wulf von Bonin, Leverkusen; Peter Vehlewald, Leichlingen; Hans-Walter Illger, Roesrath, all of Fed. Rep. of Germany

[73] Assignee: Bayer Aktiengesellschaft, Leverkusen, Fed. Rep. of Germany

[21] Appl. No.: 170,328

[22] Filed: Jul. 21, 1980

Related U.S. Application Data

[62] Division of Ser. No. 61,715, Jul. 30, 1979, Pat. No. 4,240,950.

[30] Foreign Application Priority Data

Aug. 8, 1978 [DE] Fed. Rep. of Germany ....... 2834623

[51] Int. Cl.$^3$ .............................................. C08G 18/14
[52] U.S. Cl. ................................ 521/99; 260/33.2 R; 260/37 N; 521/123; 521/164; 521/167
[58] Field of Search .................. 521/99, 123, 164, 167

[56] References Cited

U.S. PATENT DOCUMENTS

| 3,869,413 | 3/1975 | Blankenship | 521/137 |
| 4,108,791 | 8/1978 | Wasilczyk | 521/99 |
| 4,120,834 | 10/1978 | Fatutto | 521/167 |
| 4,207,227 | 6/1980 | Von Bonin | 260/40 TN |

*Primary Examiner*—Maurice J. Welsh
*Attorney, Agent, or Firm*—Gene Harsh; Joseph C. Gil

[57] ABSTRACT

The instant invention is directed to a process for the production of non-disintegrating suspensions of inorganic fillers in polyhydroxyl compounds of the type used for the production of polyurethanes, comprising reacting a suspension of an inorganic filler in a polyhydroxyl compound with from 0.1 to 2%, by weight, of a polyisocyanate, based on the weight of the suspension, at a temperature of from 30° to 200° C. The invention is also directed to the use of the suspension as the polyol component in the production of cellular polyurethane plastics.

5 Claims, No Drawings

STABILIZED FILLER SUSPENSIONS IN POLYOLS

This is a division of application Ser. No. 061,715, filed July 30, 1979, and now U.S. Pat. No. 4,240,950, issued Dec. 23, 1980.

BACKGROUND OF THE INVENTION

This invention relates to a process for stabilizing suspensions of inorganic filler powders in polyhydroxyl compounds, particularly polyether polyols, against disintegration. The filler suspensions are stabilized by reaction with small quantities of polyisocyanates at elevated temperature without any adverse effect upon the processibility of the suspensions into polyurethane plastics.

According to an earlier proposal (U.S. Ser. No. 856,075 filed Nov. 30, 1977, & now U.S. Pat. No. 4,207,227, issued June 10, 1980), suspensions of inorganic fillers in polyhydroxyl compounds, particularly polyether polyols, of the type used for producing foamed and unfoamed polyurethane plastics, can be stabilized against disintegration by the addition of a graft polymer of $\alpha,\beta$-unsaturated carboxylic acids and optionally, other comonomers on comparable polyethers. Even small quantities of these graft polymers act as excellent stabilizers when added to the filler suspension at temperatures below 60° C. However, this method of stabilization is unsatisfactory in two respects. On the one hand, the production and use of the stabilizer involves the introduction of another component into the assortment of chemicals used in the production of polyurethanes with all of the problems of storage and logistics. The stabilizer also introduces foreign reactive groups—albeit few, but nevertheless noticeable—into the polyurethane recipe and necessitates for example neutralizing agents, new stabilizers for the foaming reaction, and the like, which the final processor would rather avoid.

Accordingly, the object of the present invention is to make it possible for suspensions of inorganic fillers in polyether polyols to be stabilized solely with the chemicals commonly used in the production of polyurethanes.

DESCRIPTION OF THE INVENTION

According to the invention, this object is surprisingly achieved by reacting suspensions comprising polyols, preferably polyether polyols, and preferably from 5 to 75%, by weight, based on the suspension as a whole, of inorganic fillers with from 0.1 to 2%, by weight, of polyisocyanates at temperatures in the range from about 30° to 200° C. In this way, fluid stable suspensions are formed whereas the use of larger quantities of isocyanates or temperatures around room temperature leads to unstable suspensions or suspensions having undesirably high viscosities, for example above $10^4$ mPas.

Mixtures of polyols of the type commonly used in the production of polyurethanes and inorganic fillers have, of course, already been reacted with polyisocyanates. However, apart from different quantitative relations and temperature conditions, the processes in question are used for the production of filler-containing polyurethane plastics, whether rigid or flexible, foamed or unfoamed, and not for the production of non-disintegrating suspensions of inorganic fillers in polyether polyols suitable for use as an independent starting material for the production of polyurethanes.

Accordingly, the present invention relates to a process for the production of non-disintegrating suspensions of inorganic fillers in polyhydroxyl compounds of the type used for the production of polyurethanes, characterized in that the suspension contains 5 to 75%, by weight, most preferably 10 to 50%, by weight, of inorganic filler in a polyhydroxyl compound having a number average molecular weight of preferably from 500 to 10,000, as determined by gel permeation chromatography, more preferably 1,000 to 7,000, and is reacted with from 0.1 to 2%, by weight, based on the suspension, of a polyisocyanate at a temperature of from 30° to 200° C. and preferably at a temperature of from 100° to 150° C.

Finally, the invention also relates to the use of stable suspensions obtainable by the process according to the invention as a synthesis component in the production of foamed and unfoamed polyurethane plastics by the isocyanate polyaddition process.

In the context of the invention, inorganic fillers are also understood to include inorganic pigments known per se. It is also possible to use inorganic fillers of the type whose surfaces have been pretreated with organic or inorganic compounds of neutral, basic or acid character, for example to modify their charge or hydrophilic properties. The fillers used are essentially inorganic solids of which the constituents particles may be in the form of needles, flakes, beads or irregular particles which may be amorphous, metamorphous or crystalline and which for the most part are smaller than 10 $\mu$m in diameter. The residue on a 40 $\mu$m sieve according to DIN 53 195 should preferably amount to less than 1%, by weight, and the average particle diameter should preferably be less than 5 $\mu$m.

Suitable fillers of this type are, for example, kaolins, talcum, mica, tuff, lava, powdered asbestos, glass, chalk, dolomite, bentonits, alkali or ammonium phosphates and polyphosphates, alkaline-earth phosphates and polyphosphates, carbon black, graphite, cements, calcium oxide and hydroxides, calcium sulphate, fly ash, slags, powdered rock, titanium dioxide, iron oxides, aluminum oxides and hydroxides, powdered quartz and shale, silicas, etc. In addition to talcum, barium sulphate, kaolin and aluminum oxide hydrates, fillers containing calcium carbonate, such as chalk or dolomite, are particularly suitable for the process according to the invention.

The polyhydroxyl compounds used are preferably polyols liquid at room temperature of the type known per se in polyurethane chemistry. These compounds generally contain from 2 to 8 and preferably 2 or 3 hydroxyl groups and have molecular weights above 500 and preferably in the range from 1,000 to 7,000. It is also possible to use polyol mixtures which, in addition to polyols having molecular weights in the above-mentioned range, also contain polyols of lower molecular weight. For example, polyols in the range from 62 to 500, which should preferably be present in the mixture in quantities of less than 70%, by weight, may be used. Preferred polyhydroxyl compounds are the polyhydroxy polyesters, polyethers, polyacetals, polycarbonates or polyester amides corresponding to the above criteria. Polyhydroxy polyethers are particularly preferred because they are generally of relatively low viscosity. Mixtures of the above-mentioned polyhydroxyl compounds may also be used. However, it is also possible initially to stabilize a suspension of relatively high concentration in a single polyhydroxyl compound in accordance with the invention and subsequently to blend this stabilized suspension with other polyhydroxyl compounds before it is used as the polyol component in the production of polyurethanes.

The polyesters containing hydroxyl groups suitable for use in accordance with the invention are, for example, reaction products of polyhydric (preferably dihydric and, optionally, trihydric) alcohols with polybasic (preferably dibasic) carboxylic acids. Instead of using the free polycarboxylic acid, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted by halogen atoms and/or unsaturated.

Examples of carboxylic acids such as these and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terephthalic acid-bisglycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols and dibutyl glycol and higher polybutylene glycols. The polyesters may contain terminal carboxyl groups. Polyesters of lactones (for example ε-caprolactone) or of hydroxy carboxylic acids (for example ω-hydroxy caproic acid) may also be used.

The polyethers containing at least 2, generally 2 to 8 and preferably 2 to 3 hydroxyl groups suitable for use in accordance with the invention are also known per se. They are obtained, for example, by polymerizing epoxides. Examples of epoxides include ethylene oxide, propylene oxide, butylene oxide, tetrahydrofuran, styrene oxide or epichlorohydrin. The epoxides are reacted on their own in the presence of Lewis catalysts (such as boron trifluoride) or by the addition of these epoxides (preferably ethylene oxide and propylene oxide), either in admixture or successively, with starter components containing reactive hydrogen atoms (such as water, alcohols, ammonia or amines). Examples of alcohols and amines include ethylene glycol, 1,3-propylene glycol, 1,2-propylene glycol, trimethylol propane, glycerol, sorbitol, 4,4'-dihydroxy diphenyl propane, aniline, ethanolamine or ethylene diamine. Sucrose polyethers of the type described for example in German Auslegeschriften Nos. 1,176,358 and 1,064,938 and formitol- or formose-started polyethers (German Offenlegungsschriften Nos. 2,639,083 and 2,737,951) may also be used in accordance with the invention. In many cases, it is preferred to use polyethers which predominantly contain primary hydroxyl groups (up to 90%, by weight, based on all the hydroxyl groups present in the polyether). Polybutadienes containing hydroxyl groups are also suitable for use in accordance with the invention.

Among the polythioethers, reference is made in particular to the condensation products of thiodiglycol on its own and/or with other glycols, dicarboxylic acids, formaldehyde, aminocarboxylic acids or amino alcohols. Depending on the co-components, the products in question are for example polythio mixed ethers, polythioether esters or polythioether ester amides.

Suitable polyacetals include the compounds obtainable from glycols (such as diethylene glycol and triethylene glycol), 4,4'-dioxethoxy diphenyl dimethyl methane, hexane diol and formaldehyde. Polyacetals suitable for use in accordance with the invention may also be obtained by polymerizing cyclic acetals such as trioxane (German Offenlegungsschrift No. 1,694,128).

Suitable polycarbonates containing hydroxyl groups are known per se and can be obtained for example by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or phosgene (German Auslegeschriften Nos. 1,694,080; 1,915,908 and 2,221,751; German Offenlegungsschrift No. 2,605,024).

The polyester amides and polyamides include the predominantly linear condensates obtained from polybasic saturated or unsaturated carboxylic acids or their anhydrides and polyhydric saturated or unsaturated amino alcohols, diamines, polyamines and mixtures thereof.

According to the invention, it is also possible to use polyhydroxyl compounds containing high molecular weight polyadducts and polycondensates or polymers in finely dispersed or dissolved form. Polyhydroxyl compounds such as these are obtained by carrying out polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. However, it is also possible (U.S. Pat. No. 3,869,413 or German Offenlegungsschrift No. 2,550,860) to mix an aqueous polymer dispersion with a polyhydroxyl compound and subsequently to remove the water from the mixture.

Polyhydroxyl compounds modified by vinyl polymers of the type obtained by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795 or U.S. Pat. No. 3,637,909) are also suitable for use in the process according to the invention. Plastics having particularly good flameproof properties are obtained by using polyether polyols modified by graft polymerization with vinyl phosphonic acid esters and, optionally, (meth)acrylonitrile, (meth)acrylamide or OH-functional (meth)acrylic acid esters (German Offenlegungsschriften Nos. 2,442,101; 2,644,922 and 2,646,141).

Where modified polyhydroxyl compounds of the type mentioned above are used as starting component in the polyisocyanate-polyaddition process, polyurethanes having considerably improved mechanical properties are formed in many cases.

Representatives of the above-mentioned compounds in accordance with the invention are described for example in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5-6 and 198-199, and in Kunststoff-Handbuch, Vol. VII, Vieweg-Hochtlen, Carl-Hanser-Verlag, Munich, 1966, for example of pages 45 to 71. It is possible to use mixtures of the above-mentioned compounds containing at least two isocyanate-reactive hydrogen atoms and having a molecular weight of from 500 to 10,000, for example mixtures of polyethers and polyesters.

In some cases, it is of particular advantage to combine low-melting and high-melting polyhydroxyl compounds with one another (German Offenlegungsschrift No. 2,706,297). Other starting components which may be used in the process according to the invention are compounds containing at least two hydroxyl groups and having a molecular weight of from 62 to 500. These compounds also generally contain from 2 to 8 and preferably 2 to 3 hydroxyl groups.

Examples of compounds such as these are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol and sorbitol, castor oil, diethylene glycol, triethylene glycol, tetraethylene glycol, higher polyethylene glycols having a molecular weight of up to 500, dipropylene glycol, higher polypropylene glycols having a molecular weight of up to 500, dibutylene glycol, higher polybutylene glycols having a molecular weight of up to 500, 4,4'-dihydroxy diphenyl propane, dihydroxy methyl hydroquinone, ethanolamine, diethanolamine, N-methyl diethanolamine and triethanolamine.

Other low molecular weight polyols suitable for the purposes of the invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). In order to obtain plastics with improved flameproof properties, these formoses are advantageously used in combination with aminoplast formers and/or phosphites (German Offenlegungsschriften Nos. 2,738,513 and 2,738,532). Solutions of polyisocyanate polyaddition products, particularly polyurethane ureas containing ionic groups and/or polyhydrazo dicarbonamides, in low molecular weight polyhydric alcohols may also be used as polyol component in accordance with the invention (German Offenlegungsschrift No. 2,638,759).

As already mentioned, any mixtures of the above-mentioned polyhydroxyl compounds may be used in the process according to the invention. The polyols may optionally be mixed with other additives, such as chain extenders, stabilizers, blowing agents, dyes, emulsifiers and water. In the context of the invention, however, polyols and polyhydroxyl compounds are preferably understood to be the pure polyols.

The polyhydroxyl compounds preferably used in accordance with the invention are polyether polyols, because they are particularly suitable for producing the suspensions in accordance with the invention. It is of particular advantage to use polyether polyols based on propylene oxide or ethylene oxide or mixtures thereof which can be obtained by methods known per se and which have molecular weights of from 1,000 to 7,000. It is particularly preferred to use polyether polyols containing from 3 to 45%, by weight, preferably from 10 to 30%, by weight, of ethylene oxide. The ethylene oxide may be statistically incorporated. However, it is preferably present either as a polymer block at the ends of the polyether polyol chain or as a mixed block containing more than 30%, by weight, of incorporated ethylene oxide within the polyether polyol chain. Mixed forms of the above-mentioned polyethers may, of course, also be used.

The stabilized suspensions of inorganic fillers in polyols obtainable in accordance with the invention may contain from about 0.5 to 80%, by weight, of filler. However, the filler contents are preferably between 5 and 75%, by weight, more preferably between 10 and 50%, by weight, based on the suspension as a whole.

Higher filler contents may also be considered for applications where an increased viscosity of the suspension does not have a prohibitive effect.

To produce the suspension stabilized in accordance with the invention, the inorganic filler may be suspended in the polyol and the resulting suspension subsequently reacted with a polyisocyanate, preferably with thorough stirring, at temperatures of from 30° to 200° C., preferably from 100° to 150° C., optionally in the absence of moisture or in an inert gas atmosphere.

The process according to the invention may be carried out with aliphatic, cycloaliphatic, araliphatic, aromatic and heterocyclic polyisocyanates. Examples are described by W. Siefken in Justus Liebigs Annalen der Chemie, 562, pages 75 to 136, for example those corresponding to the formula

Q (NCO)$_n$ in which n=2-4, preferably 2, and Q represents an aliphatic hydrocarbon radical containing from 2 to 18 carbon atoms, preferably from 6 to 10 carbon atoms, a cycloaliphatic hydrocarbon radical containing from 4 to 15, preferably from 5 to 10 carbon atoms; an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms; for example ethylene diisocyanate; 1,4-tetramethylene diisocyanate; 1,6-hexamethylene diisocyanate; trimethyl hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (German Ausleschrift No. 1,202,785 or U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and/or -4,4'-diisocyanate or naphthylene-1,5-diisocyanate.

According to the invention, it is also possible for example to use triphenyl methane-4,4',4"-triisocyanate, polyphenyl polymethylene polyisocyanates of the type obtained by condensing aniline with formaldehyde, followed by phosgenation (British Pat. Nos. 874,430 and 848,671); m- and p-isocyanatophenyl sulfonyl isocyanates (U.S. Pat. No. 3,454,606); perchlorinated aryl polyisocyanates (German Auslegeschrift No. 1,157,601 or U.S. Pat. No. 3,277,138); polyisocyanates containing carbodiimide groups (German Pat. No. 1,092,007; U.S. Pat. No. 3,152,162; and German Offenlegungsschriften Nos. 2,504,400; 2,537,685 and 2,552,350); norbornane diisocyanates (U.S. Pat. No. 3,492,330); polyisocyanates containing allophanate groups (British Pat. No. 994,890; Belgian Pat. No. 761,626 and Dutch Patent Application No. 7,102,524); polyisocyanates containing isocyanurate groups (U.S. Pat. No. 3,001,973; German Pat. Nos. 1,022,789; 1,222,067 and 1,027,394 and German Offenlegungsschriften Nos. 1,929,034 and 2,004,048); polyisocyanates containing urethane groups (Belgian Pat. No. 752,261 or U.S. Pat. Nos. 3,394,164 and 3,644,457); polyisocyanates containing acylated urea groups (German Pat. No. 1,230,778); polyisocyanates containing biuret groups (U.S. Pat. Nos. 3,201,372 and 3,124,605 and British Pat. No. 889,050); polyisocyanates produced by telomerization reactions (U.S. Pat. No. 3,654,106); polyisocyanates containing ester groups (British Pat. Nos. 965,474 and 1,072,956; U.S. Pat. No. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883).

It is also possible to use the isocyanate-group-containing distillation residues obtained in the commercial production of isocyanates, if desired in solution in one or more of the above-mentioned polyisocyanates. It is also possible to use any mixtures of the above-mentioned polyisocyanates.

Although in principle a variety of different cycloaliphatic polyisocyanates, such as hexamethylene diisocyanate, isophorone diisocyanate, araliphatic polyisocyanates and aromatic polyisocyanates show stabilizing effects, it has been found that aromatic polyisocyanates (particularly mononuclear diisocyanates, such as the isomeric tolylene diisocyanates) are particularly suitable for stabilizing the suspensions.

According to the invention, the inorganic filler is preferably suspended in the polyol in a quantity of from 5 to 75%, by weight, preferably in a quantity of from 10 to 50%, by weight, at a temperature in the range from 5° to 65° C. and the resulting suspensions stirred with the isocyanate either immediately or after the required reaction temperature has been reached. It is also possible, however, initially to mix polyol and isocyanate, for example at room temperature, subsequently to stir in the filler and then to heat the mixture to the reaction temperature.

At temperatures in the preferred range from 100° to 150° C., the reaction times amount to between about 15 and 420 minutes. The reaction mixture is preferably stirred for about 1 hour at the reaction temperature. It may then be cooled while stirring.

The suspension stabilized in accordance with the invention may then be degassed, gassed, dried or provided with additives. Other fillers or filler-containing polyols, for example the so-called polymer polyols, may also be added to them. They are particularly suitable for use as starting material for the production of other types of modified polyols, for example as starting material for the production of so-called polymer polyols by grafting on styrene/acrylonitrile mixtures (U.S. Pat. Nos. 3,383,351; 3,304,351; 3,304,273; 3,523,093 and 3,110,695 and German Pat. No. 1,152,536). However, other organic filler particles, such as polyureas or polyhydrazodicarbonamides, may also be produced in situ in them (German Auslegeschriften Nos. 1,168,075 and 1,260,142 and German Offenlegungsschriften Nos. 2,324,134; 2,423,984; 2,512,385; 2,513,815; 2,550,796; 2,550,797; 2,550,833 and 2,550,862). The suspensions according to the invention are particularly valuable starting materials for the production of polyurethanes by the isocyanate polyaddition process because they do not contain any auxiliaries which might give rise to disturbances in the production of polyurethanes. They are suitable both for the production of flexible, rigid or semirigid foamed polyurethane plastics and also for the production of non-foamed polyurethanes, for example polyurethane elastomers, thermoplasts or duromers.

Accordingly, the present invention also relates to a process for the production of an optionally cellular polyurethane plastics resin comprising reacting (A) a polyisocyanate with (B) a polyhydroxyl compound containing in inorganic filler and having a molecular weight in the range from 500 to 10,000 and, optionally, (C) other isocyanate-reactive compounds, optionally in the presence of (D) catalysts, blowing agents and other additives known per se, which is characterized in that a suspension stabilized in accordance with the invention is used as component (B).

In this connection, any of the above-mentioned polyisocyanates may be used as component (A). In addition to the low molecular weight and relatively high molecular weight polyols described above, free from inorganic fillers, aliphatic and aromatic diamines in particular may also be used as chain-extending component (C).

Aliphatic diamines suitable for use in accordance with the invention are, for example ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenylmethane; p-xylene diamine; bis-(3-aminopropyl)-methylamine; diaminoperhydroanthracenes (German Offenlegungsschrift No. 2,638,731) and cycloaliphatic triamines (German Offenlegungsschrift No. 2,614,244). It is also possible to use hydrazine and substituted hydrazines, for example methyl hydrazine, N,N'-dimethyl hydrazine and their homologs. Also, acid dihydrazides, for example carbodihydrazide, oxalic acid dihydrazide, the dihydrazides of malonic acid, succinic acid, glutaric acid, adipic acid, β-methyladipic acid, sebacic acid, hydracrylic acid and terephthalic acid; semicarbazido alkylene hydrazides such as, for example β-semicarbazido propionic acid hydrazide (German Offenlegungsschrift No. 1,770,591), semicarbazido alkylene carbazinic esters such as 2-semicarbazido ethyl carbazinic ester (German Offenlegungsschrift No. 1,918,504) or even amino-semicarbazide compounds such as β-aminoethyl semicarbazido carbonate (German Offenlegungsschrift No. 1,902,931)

may be used. To control their reactivity, the amino groups may be completely or partly blocked by aldimine or ketimine groups (U.S. Pat. No. 3,734,894 or German Offenlegunsschrift No. 2,637,115).

Examples of aromatic diamines are bis-anthranilic acid esters (German Offenlegungsschriften Nos. 2,040,644 and 2,160,590); 3,5- and 2,4-diaminobenzoic acid esters (German Offenlegungsschrift No. 2,025,900); the diamines containing ester groups (German Offenlegungsschriften Nos. 1,803,635; 2,040,650 and 2,160,589 or U.S. Pat. Nos. 3,681,290 and 3,736,350); the diamines containing ether groups (German Offenlegungsschriften Nos. 1,770,525 and 1,809,172 or U.S. Pat. Nos. 3,654,364 and 3,736,295); 2-halogen-1,3-phenylene diamines which may be substituted in the 5-position (German Offenlegungsschriften Nos. 2,011,722; 2,025,896 and 2,065,896); 3,3'-dichloro-4,4'-diaminodiphenyl methane; tolylene diamine, 4,4'-diaminodiphenyl methane; 4,4'-diaminodiphenyl disulfides (German Offenlegungsschrift No. 2,404,976); diaminodiphenyl dithioethers (German Offenlegungsschrift No. 2,509,404); aromatic diamines substituted by alkyl thio groups (German Offenlegungsschrift No. 2,638,760); diaminobenzenes phosphonic acid esters (German Offenlegungsschrift No. 2,459,491); aromatic diamines containing sulfonate or carboxylate groups (German Offenlegungsschrift No. 2,720,166) and high-melting diamines (German Offenlegungsschrift No. 2,635,400). Examples of aliphatic-aromatic diamines are the aminoalkyl thioanilines (German Offenlegungsschrift No. 2,734,574).

According to the invention, other suitable chain extenders are such compounds as 1-mercapto-3-aminopropane, optionally substituted aminoacids (for example glycine, alanine, valine, serine and lysine) and optionally substituted dicarboxylic acids (for example succinic acid, adipic acid, phthalic acid, 4-hydroxy phthalic acid and 4-aminophthalic acid).

In addition, isocyanate-monofunctional compounds may be used as so-called chain terminators in proportions of from 0.01 to 10%, by weight, based on polyurethane solids. Such monofunctional compounds are monoamines (such as butyl and dibutylamine, octylamine, stearylamine, N-methyl stearylamine, pyrrolidine, piperidine and cyclohexylamine), monoalcohols (such as butanol, 2-ethyl hexanol, octanol, dodecanol), the various amyl alcohols, cyclohexanol and ethylene glycol monoethyl ether.

Additives and auxiliaries (component D) which may be used in accordance with the invention are, for example: Water and/or readily volatile inorganic or organic substances may be used as blowing agents. Organic blowing agents are, for example, acetone, ethyl acetate, halogen-substituted alkanes (such as methylene chloride, chloroform, ethylidene chloride, vinylidene chloride, monofluorotrichloromethane, chlorodifluoromethane and dichlorodifluoromethane), butane, hexane, heptane or diethyl ether. Inorganic blowing agents are, for example, air, carbon dioxide or nitrous oxide. A blowing effect may also be obtained by adding compounds which decompose at temperatures above room temperature giving off gases such as nitrogen, for example, azo compounds such as azodicarbonamide or azoisobutyronitrile. Other examples of blowing agents and information on the use of blowing agents can be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalysts known per se may be used, for example tertiary amines, such as triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528); 1,4-diazabicyclo-(2,2,2)-octane; N-methyl-N'-dimethylaminoethyl piperidine; bis-(dimethylaminoalkyl)-piperazines (German Offenlegungsschrift No. 2,636,787); N,N-dimethyl benzylamine; N,N-dimethyl cyclohexylamine; N,N-diethyl benzylamine; bis-(N,N-diethylaminoethyl)-adipate; N,N,N',N'-tetramethyl-1,3-butane diamine; N,N-dimethyl-β-phenyl ethylamine; 1,2-dimethyl imidazole; 2-methyl imidazole; monocyclic and bicyclic amidines (German Offenlegungsschrift No. 1,720,633); bis-(dialkylamino)-alkyl ethers (U.S. Pat. No. 3,330,782; German Auslegeschrift No. 1,030,558; German Offenlegungsschriften Nos. 1,804,361 and 2,618,280) and tertiary amines containing amide groups, preferably formamide groups (German Offenlegungsschriften Nos. 2,523,633 and 2,732,292). Suitable catalysts are also Mannich bases known per se of secondary amines (such as dimethylamine), aldehydes (preferably formaldehyde), ketones (such as acetone, methylethyl ketone or cyclohexanone) and phenols (such as phenol, nonyl phenyl or bisphenol).

Tertiary amines containing isocyanate-reactive hydrogen atoms suitable for use as catalyst are, for example, triethanolamine, triisopropanolamine, N-methyl diethanolamine, N-ethyl diethanolamine and N,N-dimethyl ethanolamine. Also, their reaction products with alkylene oxides, such as propylene oxide and/or ethylene oxide and also secondary-tertiary amines (German Offenlegungsschrift No. 2,732,292) may be used.

Other suitable catalysts are sila-amines containing carbon-silicon bonds (German Pat. No. 1,299,290 or U.S. Pat. No. 3,620,984), for example 2,2,4-trimethyl-2-silamorpholine and 1,3-diethylaminomethyl tetramethyl disiloxane.

Other suitable catalysts are nitrogen-containing bases (such as tetraalkyl ammonium hydroxides), alkali metal hydroxides (such as sodium hydroxide), alkali metal phenolates (such as sodium phenolate), or alkali metal alcoholates (such as sodium methylate). Hexahydrotriazines may also be used as catalysts (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effect are described in German Offenlegungsschriften Nos. 2,062,288; 2,062,289; 2,117,576 (U.S. Pat. No. 3,758,444); 2,129,198; 2,330,175 and 2,330,211.

According to the invention, it is also possible to use organometallic compounds, particularly organo-tin compounds, as catalyts. In addition to sulfur-containing compounds, such as di-n-octyl tin mercaptide (German Auslegeschrift No. 1,769,367 or U.S. Pat. No. 3,654,927), preferred organo-tin compounds are tin(II) salts of carboxylic acids, such as tin(II)acetate, tin-(II)octoate, tin(II)ethyl hexoate and tin(II)laurate; and tin(IV) compounds, for example dibutyl tin oxide, dibutyl tin dichloride, dibutyl tin diacetate, dibutyl tin dilaurate, dibutyl tin maleate or dioctyl tin diacetate.

All of the above-mentioned catalysts may, of course, be used in the form of mixtures. In this respect, combinations of organometallic compounds and amidines, aminopyridines or hydrazine pyridines (German Offenlegungsschriften Nos. 2,434,185; 2,601,082 and 2,603,834) are of particular interest.

Further examples of catalysts suitable for use in the invention and information on the way in which they work can be found in Kunststoff-Handbuch by Vieweg and Hochtlen, Vol. VII, Carl-Hanser-Verlag, Munich, 1966, for example on pages 96 to 102.

The catalysts are generally used in a quantity of from about 0.001 to 10%, by weight, based on the total quantity of compounds containing at least two isocyanate-reactive hydrogen atoms.

Surface-active additives, such as emulsifiers and foam stabilizers may be used. Suitable emulsifiers are for example the sodium salts of castor oil sulfonates or salts of fatty acids with amines, such as diethylamino oleate or diethanolamine stearate. Alkali or ammonium salts of sulfonic acids, such as for example dodecyl benzene sulfonic acid or dinaphthyl methane disulfonic acid; or of fatty acids, such as ricinoleic acid; or of polymeric fatty acids may also be used as surface-active additives.

Suitable foam stabilizers are, above all, polyether siloxanes, particularly water-soluble types. The structure of these compounds is generally such that a copolymer of ethylene oxide and propylene oxide is attached to a polydimethylsiloxane residue. Foam stabilizers such as these are described in U.S. Pat. Nos. 2,834,748; 2,917,480 and 3,629,308. In many cases, polysiloxane-polyoxyalkylene copolymers branched through allophanate groups according to German Offenlegungsschrift No. 2,558,523 are of particular interest.

Reaction retarders may be used in the process, for example acid-reacting substances (such as hydrochloric acid or organic acid halides), cell regulators known per se (such as paraffins or fatty alcohols or dimethyl polysiloxanes), pigments, dyes, flameproofing agents known per se (for example tris-chloroethyl phosphate, tricresyl phosphate or ammonium phosphate and polyphosphate), stabilizers against the effects of aging and weather, plasticizers and fungistatic and bacteriostatic substances as well as fillers (such as barium sulphate, kieselguhr, carbon black or whiting).

Further examples of surface-active additives and foam stabilizers, cell regulators, reaction retarders, stabilizers, flameproofing agents, plasticizers, dyes, fillers, fungistatic and bacteriostatic substances which may optionally be used in accordance with the invention and information on the way in which these additives are used and on their respective modes of action can be found in Kunststoff-Handbuch by Vieweg and Hochtlen, Vol. VII, Carl-Hanser-Verlag, Munich, 1966, on pages 103 to 113.

The polyurethane plastics may be prepared by reacting the components by the one-shot, prepolymer or semi-prepolymer process known per se in many cases using machines (such as described in U.S. Pat. No. 2,764,565). Particulars of processing machines which may also be used in accordance with the invention can be found in Kunststoff-Handbuch by Vieweg and Hochtlen, Vol. VII, Carl-Hanser-Verlag, Munich, 1966, on pages 121 to 205.

In the production of foams, it is also possible in accordance with the invention to carry out foaming in closed molds. To this end, the reaction mixture is introduced into a mold. Suitable mold materials are metals (for example aluminum) or plastics (for example epoxide resin). The foamable reaction mixture foams in the mold and forms the molding. In-mold foaming may be carried out in such a way that the molding has a cellular structure at its surface, although it may also be carried out in such a way that the molding has a compact skin and a cellular core. In this connection, it is possible in accordance with the invention to introduce foamable reaction mixture into the mold in such a quantity that the foam formed just fills the mold. However, it is also possible to introduce into the mold more foamable reaction mixture than is required for filling the interior of the mold with foam. This particular technique is known as overcharging and is known for example from U.S. Pat. Nos. 3,178,490 and 3,182,104.

In many cases, "external release agents" known per se, such as silicone oils, are used for in-mold foaming. However, it is also possible to use so-called "internal release agents", which may be used in admixture with external release agents, of the type known from German Offenlegungsschriften Nos. 2,121,670 and 2,307,589.

According to the invention, it is also possible to produce cold-hardening foams (British Pat. No. 1,162,517 and German Offenlegungsschrift No. 2,153,086).

However, it is, of course, also possible to produce foams by block-foaming or by the laminator process known per se.

The invention is illustrated by the following Examples in which the percentages and parts quoted are by weight, unless otherwise indicated. The filler powders used in the Examples have an upper cut of 10 $\mu$m (no particles greater than 10 $\mu$m) and an average particle diameter of approximately 3 $\mu$m and contain approximately 40% of particles smaller then 2 $\mu$m in diameter.

Filler 1 = kaolin
Filler 2 = baryta white
Filler 3 = chalk.

The following polyols are used in the Examples:

Polyol 1

A polyether started with a mixture of glycerol and propylene glycol, containing 10% ethylene oxide and approximately 90% propylene oxide and substantially free from primary hydroxyl groups; hydroxyl number: 46.

Polyol 2

A trimethylol propane-started polyether of approximately 80% propylene oxide and approximately 20% ethylene oxide; hydroxyl number: 45.

Polyol 3

A trimethylol propane-started polyether of approximately 83% propylene oxide (incorporated as a block) and approximately 17% of ethylene oxide, mostly containing primary hydroxyl groups; hydroxyl number: 28.

Polyol 4

A glycerol-started polyether of approximately 87% propylene oxide (incorporated as a block) and approximately 13% ethylene oxide, mainly containing primary hydroxyl groups; hydroxyl number: 28.

Polyol 5

A trimethylol-propane-started polyether of approximately 60% ethylene oxide and approximately 40% propylene oxide, mainly containing secondary hydroxyl groups; hydroxyl number: 26.

Polyol 6

Same as polyol 3 but with a hydroxyl number of 34.

The following polyisocyanates are used in the Examples.

Isocyanate 1

1,6-hexamethylene diisocyanate.

Isocyanate 2

4,4'-diphenylmethane diisocyanate.

Isocyanate 3

Tolylene diisocyanate containing approximately 80% of the 2,4-isomer.

Isocyanate 4

Tolylene diisocyanate containing approximately 65% of the 2,4-isomer.

Isocyanate 5

Tolylene diisocyanate containing approximately 100% of the 2,4-isomer.

The viscosities were measured with a rotary viscosimeter at 22° C., the suspension being thoroughly stirred beforehand.

Assessment:
- 1 = <5,000 MPa (22° C.)
- 2 = <10,000 MPa (22° C.)
- 3 = >10,000 MPa (22° C.)

The suspensions were produced by the following general procedure:

300 parts of filler are thoroughly stirred at room temperature with 700 parts of polyol. The suspension is then heated to the temperature indicated, after which the quantity of polyisocyanate indicated is added with intensive stirring. After intensive stirring for 1 hour at 120° C., the suspension is cooled while stirring. The quantitative ratio of filler to polyol is variable. The isocyanate may even be added before heating, i.e. at room temperature, with no adverse effects.

The sedimentation test was carried out as follows:

The suspension was introduced into a test tube 5 cm in diameter and 10 cm long and tempered for 72 hours at 75° C. The head of the test tube was then inspected for serum separation. The test tube was then inverted, i.e. turned upside down, and the sedimentation sludge, if any, left behind at what was previously the bottom of the test tube was assessed.

Suspensions produced in the same way, but without any addition of isocyanate, were assessed for comparison:

| | |
|---|---|
| 1 = very good stability | (<1 mm deposit) |
| 2 = good stability | (<3 mm deposit) |
| 3 = adequate stability | (3–5 mm deposit) |
| 4 = inadequate stability | (>5 mm deposit) |

The test results are set out in the following table:

| Example No. | 1 | 2 | 3 | 4 | 5 | 6 | 7 | 8 | 9 | 10 | 11 | 12 |
|---|---|---|---|---|---|---|---|---|---|---|---|---|
| Filler | 1 | 1 | 2 | 2 | 3 | 3 | 3 | 3 | 3 | 3 | 3 | 3 |
| %, based on suspension | 25 | 25 | 60 | 60 | 30 | 30 | 30 | 30 | 30 | 30 | 30 | 30 |
| polyol | 4 | 4 | 5 | 5 | 1 | 2 | 3 | 4 | 5 | 6 | 3 | 4 |
| isocyanate | — | 3 | — | 3 | — | — | — | — | — | — | 1 | 5 |
| %, based on suspension | — | 1.5 | — | 1 | — | — | — | — | — | — | 2 | 1 |
| added at °C. | — | 25 | — | 25 | — | — | — | — | — | — | 120 | 120 |
| viscosity | 1 | 1 | 2 | 2 | 1 | 1 | 1 | 1 | 1 | 1 | 2 | 2 |
| serum separated | 4 | 2 | 4 | 2 | 4 | 4 | 3 | 4 | 4 | 4 | 2 | 1 |
| sediment | 3 | 2 | 4 | 2 | 4 | 4 | 4 | 4 | 4 | 4 | 1 | 1 |

In the above table, "serum" means the liquid phase (essentially free of inorganic filler) which is separated as an upper layer in the test tube. "Sediment" is the sludge deposited at the bottom of the test tube.

| Example No. | 13 | 14 | 15 | 16 | 17 | 18 | 19 | 20 | 21 | 22 |
|---|---|---|---|---|---|---|---|---|---|---|
| Filler | 3 | 3 | 3 | 3 | 3 | 3 | 3 | 3 | 3 | 3 |
| %, based on suspension | 30 | 30 | 30 | 20 | 40 | 30 | 30 | 30 | 30 | 30 |
| polyol | 4 | 4 | 2 | 3 | 2 | 1 | 2 | 3 | 4 | 6 |
| isocyanate | 2 | 4 | 4 | 3 | 3 | 3 | 3 | 3 | 3 | 3 |
| %, based on suspension | 1.5 | 0.35 | 0.4 | 0.5 | 1 | 0.7 | 1 | 0.4 | 0.5 | 0.7 |
| added at °C. | 25 | 25 | 25 | 120 | 25 | 25 | 25 | 25 | 25 | 25 |
| viscosity | 2 | 2 | 1 | 2 | 1 | 1 | 1 | 2 | 2 | 1 |
| serum separated | 1 | 1 | 1 | 1 | 1 | 1 | 1 | 1 | 1 | 1 |
| sediment | 2 | 1 | 1 | 1 | 1 | 1 | 1 | 1 | 1 | |

The following Examples illustrate the use of the suspensions stabilized in accordance with the invention for the production of polyurethane foams. The components of the recipes indicated in the following Table were intensively mixed at room temperature and then left to foam freely. The foams thus obtained have the unit weight of conventional polyether foams (approximately 40 kg/m$^3$), but reduced inflammability per kg.

The following starting components are used in the foaming recipes (in addition to those mentioned above):

Catalyst 1: bis-[$\beta$-(N,N-dimethylamino)-ethyl]-ether

Catalyst 2: diazabicyclooctane (triethylene diamine)

Catalyst 3: a mixture of 5 parts of 2,2,4-trimethyl-2-silamorpholine, 35 parts of dimethylamino ethanol and 60 parts of permethylated aminoethyl piperazine.

Catalyst 4: N-methyl morpholine

Stabilizer 1: methylphenyl polysiloxane corresponding to the formula

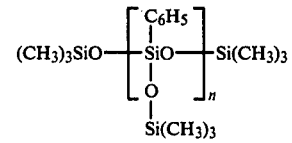

$n = 1-3$

Stabilizer 2: polyether-polysiloxane block polymer (Tegostab B 4617, a product of Goldschmidt AG, Essen West Germany)

Stabilizer 3: polyether-polysiloxane block polymer (OS 22, a product of Bayer AG, West Germany)

Isocyanate 6: a mixture of 80 parts of isocyanate 3 and 20 parts of isocyanate 2.

The figures indicated in the foaming recipes set out in the following Table represent parts by weight.

| Example No. | 23 | 24 | 25 | 26 | 27 | 28 | 29 |
|---|---|---|---|---|---|---|---|
| Suspension according to Example 18 | 100 | | | | | | |
| 19 | | 33.3 | 50 | 66.7 | | | |
| 20 | | | | | 33.3 | | |
| 21 | | | | | | 50 | 66.7 |
| Polyol 4 | | 66.7 | 50 | 33.3 | 66.7 | 50 | 33.3 |
| Water | 3.0 | 2.9 | 2.9 | 2.9 | 2.9 | 2.9 | 2.9 |
| Catalyst 1 | | 0.1 | 0.1 | 0.1 | 0.1 | 0.1 | 0.1 |
| Catalyst 2 | | 0.5 | 0.5 | 0.5 | 0.5 | 0.5 | 0.5 |
| Catalyst 3 | 0.1 | | | | | | |
| Catalyst 4 | | 0.8 | 0.8 | 0.8 | 0.8 | 0.8 | 0.8 |
| Stabilizer 1 | | 1.0 | 1.0 | 1.0 | 1.0 | 1.0 | 1.0 |
| Stabilizer 2 | | 0.1 | 0.1 | 0.1 | 0.1 | 0.1 | 0.1 |
| Stabilizer 3 | 0.8 | | | | | | |
| Dibutyl tin dilaurate | | 0.03 | 0.03 | 0.03 | 0.03 | 0.03 | 0.03 |
| Tin dioctoate | 0.25 | | | | | | |
| Isocyanate 3 | 36.6 | | | | | | |
| Isocyanate 6 | | 36.2 | 36.3 | 36.4 | 35.6 | 35.3 | 35.1 |
| Gross density (kg/m$^3$) | 45 | 40 | 39 | 39 | 39 | 40 | 40 |
| Tensile strength (KPa) according to DIN 53571 | | 135 | 141 | 138 | 134 | 139 | 141 |
| Elongation (%) according to DIN 53571 | | 184 | 172 | 154 | 182 | 176 | 154 |
| Compression hardness (KPa) according to DIN 53577 | | 3.4 | 4.1 | 4.6 | 3.2 | 3.7 | 3.9 |
| Permanent compression set (90%) according to DIN 53572 | | 9.4 | 13.5 | | 8.0 | 8.5 | 9.0 |

What is claimed is:

1. In a process for the production of cellular polyurethane plastics comprising:
   (A) polyisocyanates with
   (B) polyhydroxyl compounds containing inorganic fillers and having a molecular weight of from 500 to 10,000 and, optionally,
   (C) other isocyanate-reactive compounds, optionally in the presence of
   (D) catalyts, blowing agents and other additives known per se, the improvement wherein component (B) is a stabilized suspension obtained by reacting a suspension of an inorganic filler in a polyhydroxyl compound with from 0.1 to 2%, by weight, of a polyisocyanate, based on the weight of the suspension, at a temperature of from 30° to 200° C.

2. The process of claim 1, wherein said suspension comprises 5 to 75%, by weight, of an inorganic filler in a polyhydroxy polyether having a molecular weight of from 500 to 10,000.

3. The process of claim 1, wherein the reaction temperature is from 100° to 150° C.

4. The process of claim 2, wherein said polyisocyanate is diisocyanate.

5. The process of claim 1, wherein said suspension contains 20 to 50%, by weight, of chalk powder having a particle size of less than 10 μm in a polyhydroxy polyether having a molecular weight of from 1,000 to 7,000.